April 22, 1952 A. C. SCHROEDER ET AL 2,593,616

ELECTRONIC SPECTROSCOPES

Filed Dec. 16, 1949 2 SHEETS—SHEET 1

Inventors
Alfred C. Schroeder
& George C. Sziklai

By

Morris A. Rabkin

Attorney

ELECTRONIC SPECTROSCOPES

Filed Dec. 16, 1949 2 SHEETS—SHEET 2

Inventors
Alfred C. Schroeder
& George C. Sziklai
By Morris A. Rabin
Attorney

Patented Apr. 22, 1952 2,593,616

UNITED STATES PATENT OFFICE 2,593,616

ELECTRONIC SPECTROSCOPE

Alfred C. Schroeder, Feasterville, Pa., and George C. Sziklai, Princeton, N. J., assignors to Radio Corporation of America, a corporation of Delaware Application December 16, 1949, Serial No. 133,332

7 Claims. (Cl. 250—208)

Figure 1:
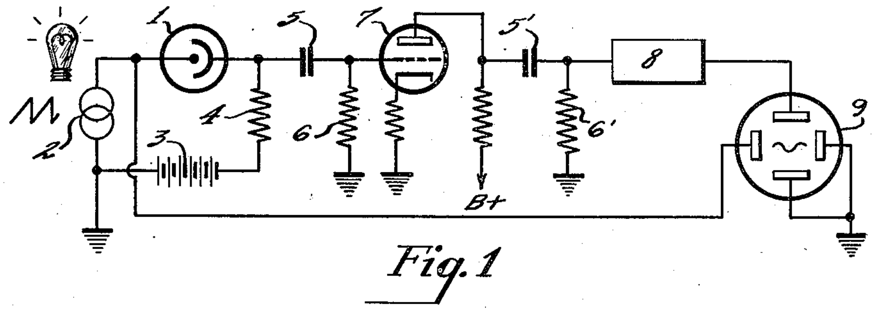

This invention relates to electronic spectroscopes which are utilized to determine the exact color content of light, and has for its principal objects the provision of an improved device and method of operation whereby a continuous indication of such color content may be made available or whereby one color may be made to match another color which is utilized as a standard.

The present application is a division of our copending application Serial No. 617,856, filed September 21, 1945, now Patent No. 2,519,154 issued August 15, 1950.

In practicing the invention, a voltage of sawtooth wave shape is applied to a photo-electric cell and the instantaneous current output of the cell is utilized to produce a voltage drop across a resistor connected in series with the cell. This voltage is amplified, differentiated twice and applied to the vertical deflectors of a cathode ray oscillograph tube. The horizontal deflectors of the tube have applied to them the same sawtooth voltage as that applied to the photo-electric cell. The resulting pattern or curve appearing on the fluorescent screen of the tube shows intensity or amplitude as a function of the frequency of the light applied to the photo-electric cell.

The invention will be better understood from the following description considered in connection with the accompanying drawings and its scope is indicated by the appended claims.

Figure 2:
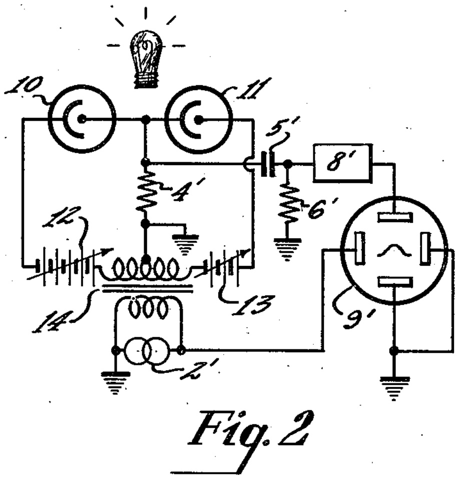
Figure 3:
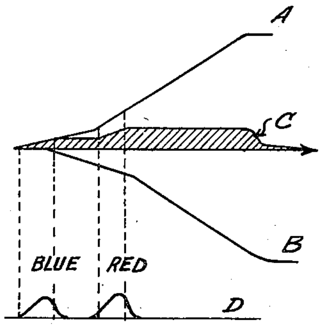
Figure 4:
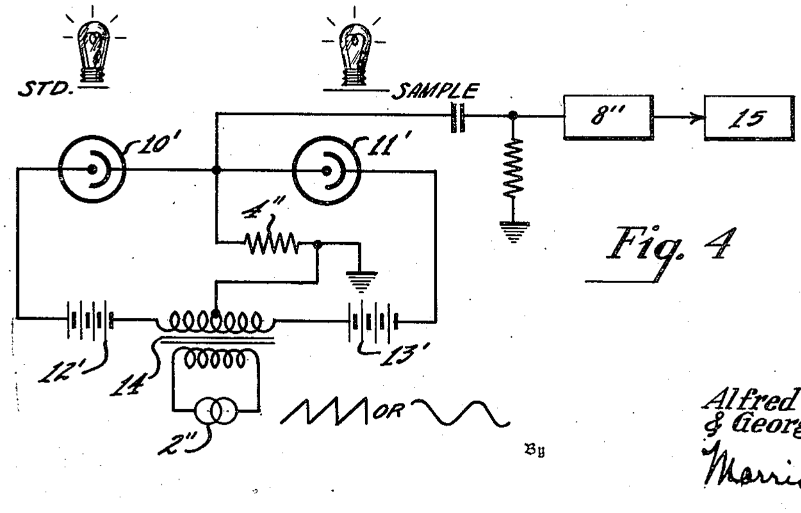
Figure 5:
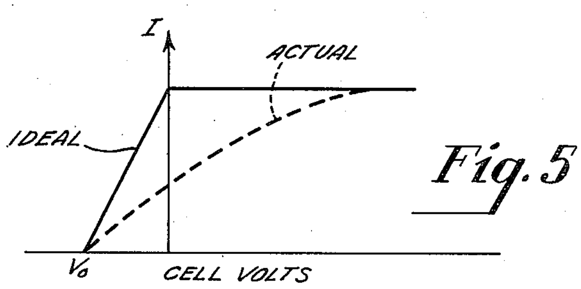

Referring to the drawings:

Figure 1 illustrates a modification of the invention including a single photo-electric cell to which the light to be analyzed is applied, Fig. 2 illustrates a modification wherein two photo-electric cells are so related as to perform the first differentiation of the voltage produced by the current output of the cells, Fig. 3 is an explanatory diagram relating to the operation of the device of Fig. 2, Fig. 4 illustrates a modification adapted for use in connection with the comparison or matching of colors during a dyeing process or the like, Fig. 5 illustrates the characteristic response of a photo-electric cell to monochromatic light.

Figure 6:
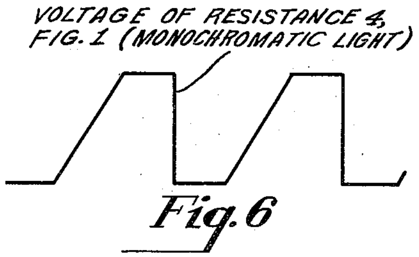
Figure 9:
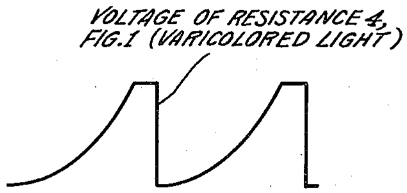
Figures 7, 8, 10, 11:
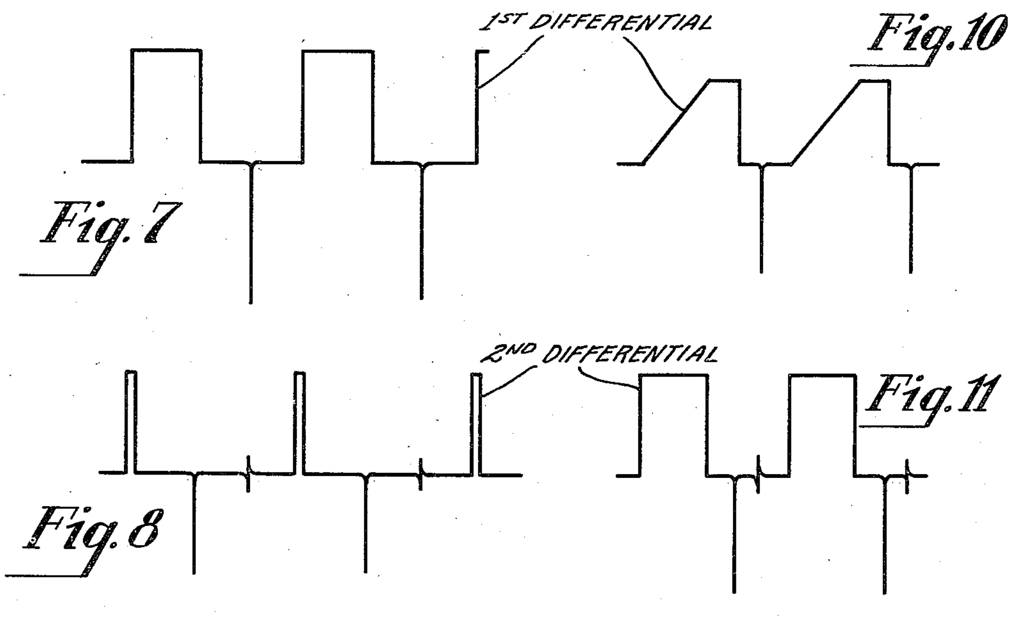

In the curves of Figs. 6, 7 and 8, the abscissae are frequencies of applied monochromatic light and the ordinates are respectively (1) photoelectric-cell current, (2) such current differentiated once and (3) such current differentiated twice, and Figs. 9, 10 and 11 are similar to Figs. 6, 7 and 8 with the exception that the applied light is assumed to include a band of colors instead of being monochromatic.

The spectroscope of Fig. 1 includes a photoelectric cell 1 to which voltage from a source 2 is applied through an adjustable source of potential 3 and a resistor 4. The voltage of the source 2 preferably has a sawtooth wave shape and has the bias potential of its zero line or its center potential determined by adjustment of the battery 3. It should be understood that the battery 3 applies a negative potential to the anode of electron collector of the cell 1 and that the value of this potential is adjusted for the purpose of making the device responsive to light waves of different frequency (light of different color). The variation in the current output of the cell 1 changes the potential across the resistor 4.

The voltage across the resistor 4 is applied to a differentiating circuit 5—6 and is thereafter amplified by an amplifier 7.

The output of the amplifier 7 is differentiated by a differentiating circuit 5′—6′ and is thereafter applied to the vertical deflectors of a conventional cathode ray tube 9. Output voltage from the source 2 is applied to the horizontal deflectors of this tube either directly or after amplification if found desirable.

The characteristic of the photo-electric cell with monochromatic light applied to it is shown by Fig. 5. In this figure, the current output of the cell is plotted as a function of the voltage across the cell in an idealized case. Due to imperfect collection of all the photo-electrons, the actual characteristic looks like the dotted line. $V_0$ is the negative voltage determined from the equation $hf=eV_1$ where $h$=Planck's constant, $f$ is the frequency of the applied light, and $e$ is the charge of the electron minus the work function voltage of the material comprising the cathode of the cell. Otherwise stated, $$V_0=-(V_1-V_{wf})$$

$V_0$ for blue light is about one volt different from $V_0$ for red light.

When a voltage having a sawtooth wave shape is applied to the cell 1, its output voltage in the case of light of a single color changes linearly with time and the current output of the cell and the voltage across the resistor 4 varies as indicated by the curve of Fig. 6. After one differentiation, it varies as indicated by the curve of Fig. 7. After a second differentiation, it appears as indicated by the curve of Fig. 8.

Figure 9 is a curve representative of the waveshape of voltage developed across the resistance 4 of Figure 1 when a light which includes all the colors of the spectrum is applied to the photoelectric cell 1. It will be noted that the leading edge of the resultant waveshape has a continuously increasing curvature, corresponding to the continuously increasing current flow through the photo-electric cell, as the applied sawtooth voltage passes through the threshold potentials of the various frequencies of which the spectrum of the applied light is composed. Figure 10 and Figure 11 are, respectively, representative of the waveshapes of voltage developed after a first and after a second differentiation.

In the case of the monochromatic light, the second differential curve, represented by Figure 8, is a substantially rectangular narrow pulse positioned with respect to the beginning of the rise of the applied sawtooth wave and the end of its rise at the place where the applied sawtooth potential crosses the threshold potential corresponding to the wavelength of the monochromatic light for the type of photosensitive surface used in the photo-cell. In the case of the multichrome light, the second differential curve represented by Figure 11 is a substantially rectangular pulse whose width is substantially equal to that of the applied sawtooth wave. This is to be expected since the threshold potentials of the spectrum frequencies are continuously being passed through as the voltage of the sawtooth waveshape being applied to the photocell is continuously increasing, and the total current flowing at any instant is the summation of the currents for the individual wavelengths. The rectangular waveshapes shown are the ideal condition. In practice, the corners of the rectangular pulses are somewhat rounded, as can be deduced from the dotted curve of Figure 5.

Therefore, in the embodiment of the invention shown schematically in Figure 1, there is provided a system whereby the spectral distribution of the light, which is permitted to shine on the photocell 1, is continuously displayed on the fluorescent screen of the cathode ray tube 9 as upwardly extending lobes which are displaced along the abscissa provided by the applied sawtooth voltage. The color content is indicated by the position along the abscissa at which the upward lobes appear, corresponding to the threshold potentials of the frequency content of the applied light. Color range is indicated by the width of these lobes.

Effectively, the photocell 1 acts to alter the rate of increase of different portions of the sawtooth voltage wave shape applied to the photocell in accordance with the color content of the light applied to the photocell. The wave form of the voltage across the resistor 4 then varies with the color content of the light. By double differentiation, those portions of the wave form where the rate of increase was changed are separated from the remainder of the curve for identification.

The spectroscope of Fig. 2 includes two photoelectric cells 10 and 11 which are biased at slightly different center potentials by adjustable sources 12 and 13. Alternating potential is applied from a source 2′ through a center tapped transformer 14. The two photocells are connected in series across the transformer secondary and the connection between the two photocells is joined to the center tap through a resistor 4′ so that they are excited out of phase from the source 2′. The voltage produced by the resultant current of the cells appears at the terminals of the resistor 4′. This resistor 4′ is connected between the common terminal of the two photocells and the center tap of the secondary winding of the transformer 14.

The spectroscope, of which Fig. 2 is a schematic representation, is otherwise similar to that of Fig. 1.

How the device of Fig. 2 operates is indicated by Fig. 3. In the latter figure, curves A and B indicate the output voltages of the cells 11 and 10 respectively when exposed to light of red and blue content. Curve A is like curve B with the exception that it is delayed by the difference in the bias of the two cells. The sum of the two potentials, which appears across the resistor 4′, is indicated by curve C and is substantially the differential of the curve A. This may be more clearly seen from the following: If the output from photocell 10 is $y=f(x)$, then the output from photocell 11 is greater than this by $\Delta x$, or equals $f(x)+\Delta x$. This occurs because the output from photocell 10 is delayed by the slightly greater bias. Differentiating $y$ with respect to $x$, $$\frac{dy}{dx}=\frac{f(x+\Delta x)-f(x)}{\Delta x}$$

Since the outputs of photocells 11 and 10 are opposingly combined across resistor 4′ this output represented by curve C is substantially the differential of the curve A. When this voltage is differentiated by the circuit 5′–6′, the result is like the curve D by the positions of the peaks along the abscissa of the curve D. From the curve D, the color content of the light is readily determined.

The device of Fig. 4 is similar to that of Fig. 2 with the exception that (1) the two bias potentials are equal and (2) one of the cells observes the light to be analyzed or tested while the other observes light from a standard to be matched.

Thus, when the two cells are illuminated by light of the same color content, the output voltage across the resistor 4″ is zero. When the colors are not matched, however, there is a resultant which is amplified by the amplifier 8″ and may be utilized to actuate a relay 15 which controls a dyeing process or the like.

This circuit finds particular application in continuous dyeing processes (such as dyeing of yarns, filter sheets, etc.) where the output of the bath is to be continuously matched and the equipment is stopped immediately if the material is mismatched with respect to the standard. Numerous other practical applications of the different modifications of the invention will be apparent to those skilled in the art.

What is claimed is:

1. The combination of light responsive means, means for applying to said light responsive means a first voltage which varies linearly with time, means for producing a second voltage proportional to the current of said light responsive means, means for producing a third voltage which is a derivative of said second voltage, a cathode ray tube having a pair of axes at an angle to each other, means for producing an effect along one of said axes dependent upon said third voltage and means to displace said effect along the other of said axes with said first voltage as a time base.

2. A system for determining the spectral distribution of light comprising in combination a photo-electric cell upon which said light falls, means for applying a voltage of sawtooth wave shape to said cell, means for twice differentiating the output voltage of said cell, and means for providing a continuous representation of said twice differentiated voltage.

3. The combination of a pair of light responsive elements having a common terminal and biased to predetermined center voltages, means for applying to said elements a voltage of sawtooth wave form, means connected in series with said common terminal for deriving the first derivative of the output voltage of said elements, means for differentiating said first derivative voltage, and means for visually displaying said differentiated first derivative voltage.

4. The combination of a pair of light responsive elements having a common terminal and biased to predetermined center voltages, means for applying to each of said elements an out of phase voltage of sawtooth wave form, means connected in series with said common terminal for deriving the first derivative of the output voltage of said elements, means for differentiating said first derivative voltage, and means for producing an effect proportional to said differentiated first derivative voltage.

5. The combination of a pair of light responsive elements having a common terminal and biased to different center voltages, means for applying to each of said elements an out of phase voltage of sawtooth wave form, and means connected in series with said common terminal for deriving the first derivative of the output voltage of said elements.

6. The combination of a pair of photo-electric cells connected in series and having a common terminal between them, means to apply a direct current bias to each of said photocells, a transformer having a primary and a center tapped secondary winding, said pair of photo-electric cells being coupled across said transformer secondary winding, a resistor coupling said common terminal with the center tap of said center tapped secondary winding, a differentiating circuit connected to said common terminal and means coupled to the output of said differentiating circuit to create an effect dependent upon said output.

7. The combination of a pair of photo-electric cells connected in series and having a common terminal between them, means to apply a direct current bias to each of said photo-cells, a transformer having a primary and a center tapped secondary winding, said pair of photo-electric cells being coupled across said transformer secondary winding, means to couple said transformer primary to a source of voltage having a sawtooth wave shape, a resistor coupling said common terminal with the center tap of said center tapped secondary winding, a differentiating circuit connected to said common terminals, a cathode ray oscilloscope tube having vertical and horizontal deflectors, means coupling said oscilloscope tube vertical deflectors with the output of said differentiating circuit and means coupling said oscilloscope tube horizontal deflectors to said transformer primary to excite said horizontal deflectors with said sawtooth wave shape voltage source.

ALFRED C. SCHROEDER.
GEORGE C. SZIKLAI.

REFERENCES CITED

The following references are of record in the file of this patent:

UNITED STATES PATENTS

| Number | Name | Date |
|---|---|---|
| 1,806,198 | Hardy | May 19, 1931 |
| 2,043,800 | Karolus | June 9, 1936 |
| 2,065,758 | Shepard Jr. | Dec. 29, 1936 |
| 2,225,353 | Scheldorf | Dec. 17, 1940 |
| 2,499,484 | Friend | Mar. 7, 1950 |